C. WILSON.
Grain Drill.

No. 68,403.

Patented Sept. 3, 1867.

Witnesses:

Inventor:

United States Patent Office.

CARMAN WILSON, OF STAMFORD, CONNECTICUT, ASSIGNOR TO WILLIAM L. SMITH, OF THE SAME PLACE.

Letters Patent No. 68,403, dated September 3, 1867.

IMPROVEMENT IN EARTH-PULVERIZER AND SEEDER COMBINED.

The Schedule referred to in these Letters Patent and making part of the same.

TO ALL WHOM IT MAY CONCERN:

Be it known that I, CARMAN WILSON, of Stamford, Fairfield county, Connecticut, have invented a new and useful Earth-Pulverizer and Seed-Sower Combined; and I do hereby declare that the following is a full, clear, and exact description of the same, reference being had to the accompanying drawing, forming part of this specification, in which—

Similar letters of reference indicate corresponding parts in both figures.

Figure 1:
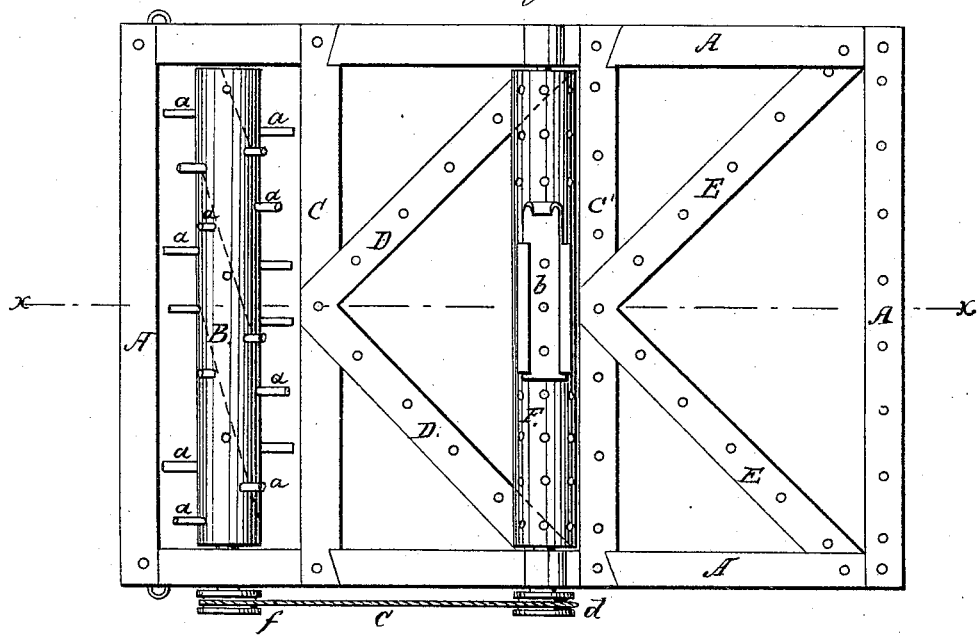
Figure 1 is a plan or top view of my invention.
Figure 2:
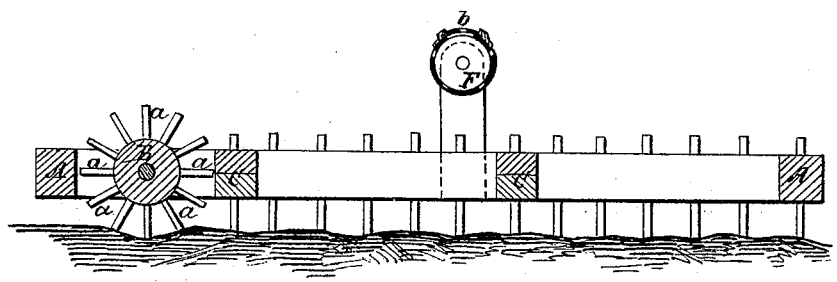
Figure 2 is a longitudinal vertical section thereof, taken on the plane of the line $x.x$, fig. 1.

The nature of this invention consists in an earth-pulverizer, having a rotary lump-breaker arranged in the forward part of a toothed frame, of novel construction; it consists, also, in the combination therewith of a revolving seed-sowing device.

A designates a quadrilateral frame, in the forward part of which a roller, B, is journalled. This roller is studded with teeth $a\ a$, which, in the present instance, are arranged spirally around it, but which may be arranged in a line parallel with the length thereof if desirable. Across the frame A there are secured two beams C C'. To the beam C, at a point about midway of its length, there is secured the apex of a V-shaped frame, D, whose legs are secured at the points of junction of the beam C' and the frame A; and to the beam C', at a point about midway of its length, there is secured the apex of a V-shaped frame, E, whose legs are secured at the rear corners of the frame A. These frames D E are provided with a number of teeth, $a$, similar to ordinary harrow-teeth, and so also are the cross-beams C C' and the rear side or strip of the frame A provided with similar teeth. F is a revolving cylinder mounted in bearings on the frame near the cross-beam C'. This cylinder has a door, $b$, on one of its sides, through which to deposit seed in the cylinder, and it is perforated with holes sufficiently large to allow the kind of seed to be sown to drop out of it. The cylinder shaft is provided with a pulley, $d$, on one of its ends, which is connected by a belt, $e$, to a pulley, $f$, on the end of the roller-shaft or journal, by means of which a rotary motion is imparted to the seed-cylinder by the roller B. Instead of pulleys and belts, cog gearing may be employed, or any other suitable mechanism, for giving the cylinder the required motion for throwing out and scattering the seed.

The operation is as follows: As the machine is drawn along the toothed roller B revolves and knocks the lumps of earth in pieces. The teeth of the V-shaped frame D then pulverize it; they also tend to throw or guide off on either side of the machine loose sods and stones which are too large to pass between the teeth. The seed-sowing cylinder then drops the seed, and the teeth of the V-shaped frame E and of the rear side of the frame A further pulverize the earth and cover up the seed. It will be observed that the earth-pulverizing device can be used with or without the seed-sowing cylinder; and I will remark in this connection that it does its work in a very superior manner.

I am aware of a harrow having a toothed roller journalled in its frame, and teeth all around it; I do not, therefore, claim the combination of a roller with a harrow-frame.

What I claim as my invention, and desire to secure by Letters Patent, is—

1. The combination of the toothed roller and harrow-frame, when so arranged that whenever the machine is in proper position to operate upon the ground the roller shall be in advance of the harrow, substantially as herein specified.

2. In combination with such earth-pulverizing device, I claim the revolving seed-sowing cylinder F, constructed and operating substantially as herein specified.

CARMAN WILSON.

Witnesses:
M. M. LIVINGSTON,
JOHN R. COOPER.